(12) United States Patent
Tarumi et al.

(10) Patent No.: US 6,544,603 B2
(45) Date of Patent: Apr. 8, 2003

(54) LIQUID-CRYSTALLINE MEDIUM

(75) Inventors: Kazuaki Tarumi, Seeheim (DE); Brigitte Schuler, Haibach (DE); Eike Poetsch, Mühltal (DE)

(73) Assignee: Merck Patent GmbH, Darmstadt (DE)

( * ) Notice: Subject to any disclaimer, the term of this patent is extended or adjusted under 35 U.S.C. 154(b) by 72 days.

(21) Appl. No.: 09/729,769

(22) Filed: Dec. 6, 2000

(65) Prior Publication Data

US 2001/0009272 A1 Jul. 26, 2001

(30) Foreign Application Priority Data

Dec. 7, 1999 (DE) .......................... 199 58 795

(51) Int. Cl.⁷ .......................... C09K 19/30; C09K 19/12
(52) U.S. Cl. ............... 428/1.1; 252/299.63; 252/299.66
(58) Field of Search ........................ 252/299.63, 299.66; 428/1.1

(56) References Cited

U.S. PATENT DOCUMENTS 6,180,027 B1 * 1/2001 Kato et al. ............. 252/299.63
6,207,076 B1 * 3/2001 Kato et al. ............. 252/299.63

* cited by examiner

Primary Examiner—Shean C. Wu
(74) Attorney, Agent, or Firm—Millen, White, Zelano & Branigan, P.C.

(57) ABSTRACT

The invention relates to a liquid-crystalline medium based on a mixture of polar compounds having positive dielectric anisotropy, characterized in that it comprises one or more compounds of the formula I

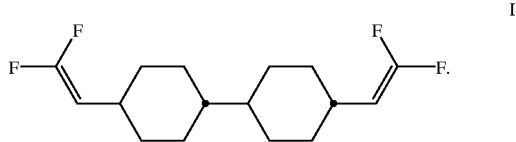

20 Claims, No Drawings

LIQUID-CRYSTALLINE MEDIUM

The present invention relates to a liquid-crystalline medium, to the use thereof for electro-optical purposes and to displays containing this medium.

Liquid crystals are used, in particular, as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and give short addressing times, low threshold voltages and high contrast in the cells.

They should furthermore have a suitable mesophase, for example a nematic or cholesteric mesophase for the above-mentioned cells, at conventional operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, must satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high resistivity, good UV and temperature stability and low vapour pressure are desired for matrix liquid-crystal displays containing integrated non-linear elements for switching individual pixels (MLC displays).

Matrix liquid-crystal displays of this type are known. Non-linear elements which can be used for individual switching of the individual pixels are, for example, active elements (i.e. transistors). This is then referred to as an "active matrix", and a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material limits the display size, since even modular assembly of various part-displays results in problems at the joints.

In the case of more promising type 2, which is preferred, the electro-optical effect used is usually the TN effect. A distinction is made between two technologies: TFTs comprising compound semiconductors, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be expanded to fully colour-compatible displays, in which a mosaic of red, green and blue filters is arranged in such a way that each filter element is located opposite a switchable pixel.

The TFT displays usually operate as TN cells with crossed polarizers in transmission and are backlit.

The term MLC displays here covers any matrix display containing integrated non-linear elements, i.e., besides the active matrix, also displays containing passive elements, such as varistors or diodes (MIM=metal-insulator-metal).

MLC displays of this type are particularly suitable for TV applications (for example pocket TVs) or for high-information displays for computer applications (lap-tops) and in automobile or aircraft construction. Besides problems regarding the angle dependence of the contrast and the response times, difficulties also arise in MLC displays due to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops, and the problem of after-image elimination can occur. Since the resistivity of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high resistivity values. It is furthermore important that the resistivity increases as little as possible with increasing temperature and after heating and/or UV exposure. The low-temperature properties of the mixtures of the prior art are also particularly disadvantageous. It is required that crystallization and/or smectic phases do not occur, even at low temperatures, and that the temperature dependence of the viscosity is as low as possible. The MLC displays of the prior art thus do not satisfy today's requirements.

There thus continues to be a great demand for MLC displays which have very high resistivity at the same time as a broad operating temperature range, short response times, even at low temperatures, and a low threshold voltage, and which do not have these disadvantages, or only do so to a reduced extent.

In TN (Schadt-Helfrich) cells, media are desired which facilitate the following advantages in the cells:
  expanded nematic phase range (in particular down to low temperatures)
  switchability at extremely low temperatures (outdoor use, automobile, avionics)
  increased resistance to UV radiation (longer life).

The media available from the prior art do not allow these advantages to be achieved while simultaneously retaining the other parameters.

In the case of supertwisted (STN) cells, media are desired which enable greater multiplexability and/or lower threshold voltages and/or broader nematic phase ranges (in particular at low temperatures). To this end, a further extension of the parameter latitude available (clearing point, smectic-nematic transition or melting point, viscosity, dielectric parameters, elastic parameters) is urgently desired.

It is an object of the invention to provide media in particular for these MLC, TN or STN displays which do not have the abovementioned disadvantages or only do so to a reduced extent, and preferably at the same time have very high resistivity values and low threshold voltages.

For some applications it would be particularly desirable to further reduce the viscosity at low temperatures so as to achieve even faster response times.

Upon further study of the specification and appended claim, further objects and advantages of this invention will become apparent to those skilled in the art.

It has now been found that the above objects can be achieved by using media according to the invention in displays.

The invention thus relates to a liquid-crystalline medium based on a mixture of polar compounds having positive dielectric anisotropy, characterized in that it comprises a compound of the formula I

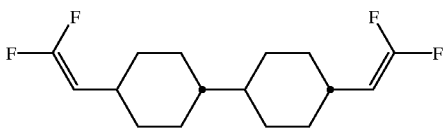

The compound of the formula I has a broad range of applications. This compound can be added to liquid-crystalline base materials from other classes of compounds in order, for example, to modify the dielectric and/or optical anisotropy of a dielectric of this type and/or to optimize its threshold voltage and/or its viscosity.

In the pure state, the compound of the formula I is colorless, mesogenic and compatible with nematic liquid crystal media. It is stable chemically, thermally and to light. The compound of the formula I is prepared by methods known per se, as described in the literature (for example in the standard works, such as Houben-Weyl, Methoden der Organischen Chemie, Georg-Thieme-Verlag, Stuttgart), to be precise under reaction conditions which are known and suitable for said reactions. Use can also be made here of variants which are known per se, but are not mentioned here in greater detail.

The compound of the formula I is preferably in all-trans configuration

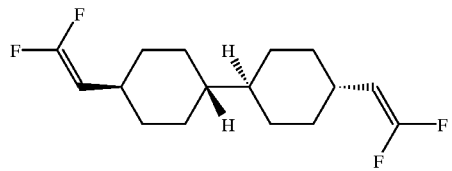

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high resistivity which is located in the cell) which contain media of this type, and to the use of these media for electro-optical purposes.

The liquid-crystal mixtures according to the invention allow a significant extension of the parameter latitude which is available. Thus, the achievable combinations of clearing point, viscosity at low temperature, thermal and UV stability and dielectric anisotropy are far superior to current prior art materials.

The requirement for a high clearing point, nematic phase at low temperature, a high Δε and simultaneously a low viscosity has hitherto only been met inadequately. Although known mixtures have similarly high clearing point and Δε values and a favourable birefringence, the rotation viscosity $\gamma_1$ is still not low enough.

The birefringence of the media according to the invention is preferably 0.060 to 0.140, more preferably 0.065 to 0.100 and most preferably 0.070 to 0.090.

Other mixture systems have comparable viscosities and Δε values, but only clearing points in the region of 60° C.

While maintaining the nematic phase down to −20° C., preferably down to −30° C., particularly preferably down to −40° C., the liquid-crystal mixtures according to the invention allow clearing points above 80° C., preferably above 85° C., particularly preferably above 90° C., and simultaneously dielectric anisotropy values Δε≧5, preferably ≧7 and a high resistivity to be achieved, allowing excellent STN and MLC displays to be obtained. In particular, the mixtures are characterized by low operating voltages. The TN thresholds are below 2.0 V, preferably below 1.8 V, particularly preferably <1.6 V.

It goes without saying that a suitable choice of the components of the mixtures according to the invention also allows higher clearing points (for example above 110° C.) to be achieved at higher threshold voltages, or lower clearing points to be achieved at lower threshold voltages, while retaining the other advantageous properties. Likewise, mixtures of higher Δε and thus lower thresholds can be obtained at viscosities which are increased correspondingly little. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favourable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher resistivities can be achieved using the mixtures according to the invention at the first minimum than in the case of mixtures comprising cyano compounds. A person skilled in the art can use simple routine methods to produce the birefringence necessary for a specified layer thickness of the MLC display by suitable choice of the individual components and their proportions by weight.

The rotational viscosity at 20° C. is preferably <150 mPa.s, particularly preferably <130 mPa.s. The nematic phase range is preferably at least 90°, in particular at least 100°. This range preferably extends at least from −20° to +80°.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] show that mixtures according to the invention and comprising compounds of the formula I exhibit a considerably smaller drop in the HR with increasing temperature than do analogous mixtures in which the compounds of the formula I are replaced by cyanophenylcyclohexanes of the formula

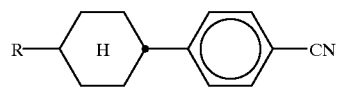

or esters of the formula

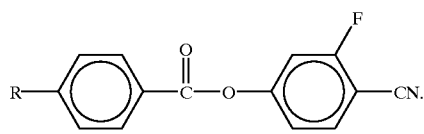

Furthermore it has been found that mixtures according to the invention comprising a compound of the formula I have a higher clearing point and a higher $\Delta\epsilon$ than analogous mixtures comprising cyanophenylcyclohexanes of the above formula. Compared with the latter mixtures, the mixtures according to the invention also have a lower $\Delta n$, which is favorable for many applications.

The UV stability of the mixtures according to the invention is also considerably better, i.e. they exhibit a significantly smaller drop in HR on UV exposure.

The media according to the invention are preferably based on a compound of the formula I, i.e. the proportion of these compounds is, for example, 5–95%, such as 30–80% or 5–50%, preferably 10–60%, e.g., 10–40%, and particularly preferably in the range 13–50%, e.g., 13–30%. Other ranges are permissible, e.g., 3–80% or 3–45%.

The individual compounds of the formulae I to XII and their subformulae which can be used in the media according to the invention are either known or can be prepared analogously to the known compounds.

Preferred embodiments are indicated below:

The medium additionally comprises one or more compounds selected from the group consisting of the general formulae II to VI:

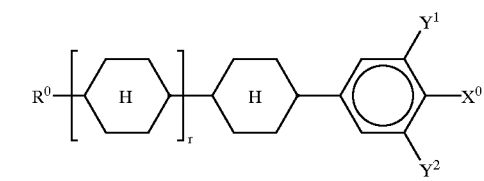

II

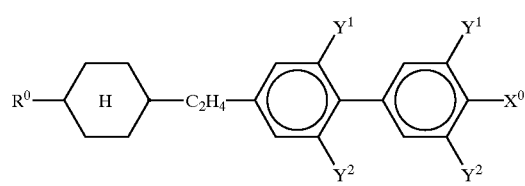

III

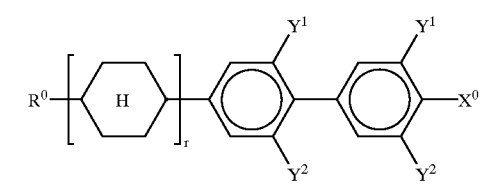

IV

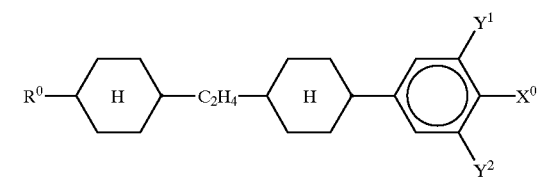

V

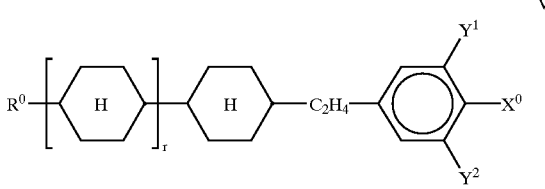

VI in which the individual radicals have the following meanings:

$R^0$ is n-alkyl, oxaalkyl, fluoroalkyl or alkenyl, in each case having up to 9 carbon atoms, $X^0$ is F, Cl, halogenated alkyl, halogenated alkenyl or halogenated alkoxy having 1 to 6 carbon atoms, $Y^1$ and $Y^2$ are each, independently of one another, H or F, r is 0 or 1.

The compound of the formula IV is preferably

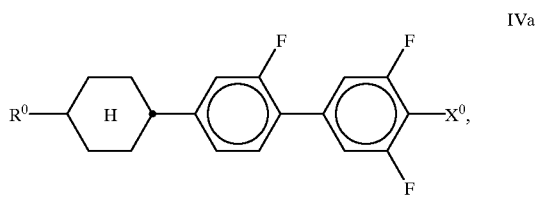

IVa

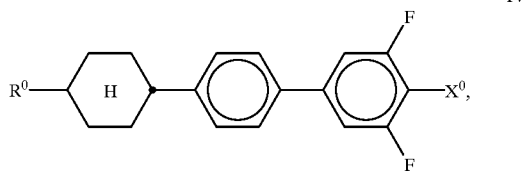

IVb

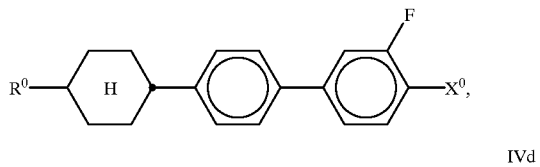

IVc

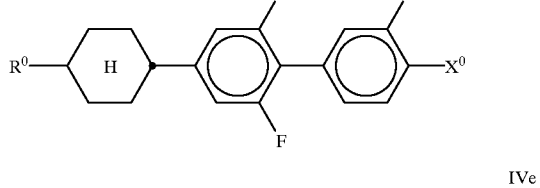

IVd

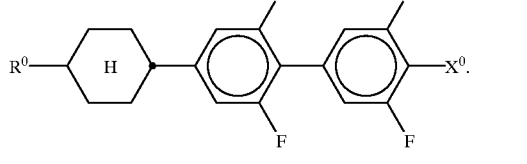

IVe

The medium additionally comprises one or more compounds selected from the group consisting of the general formulae VII to XII:

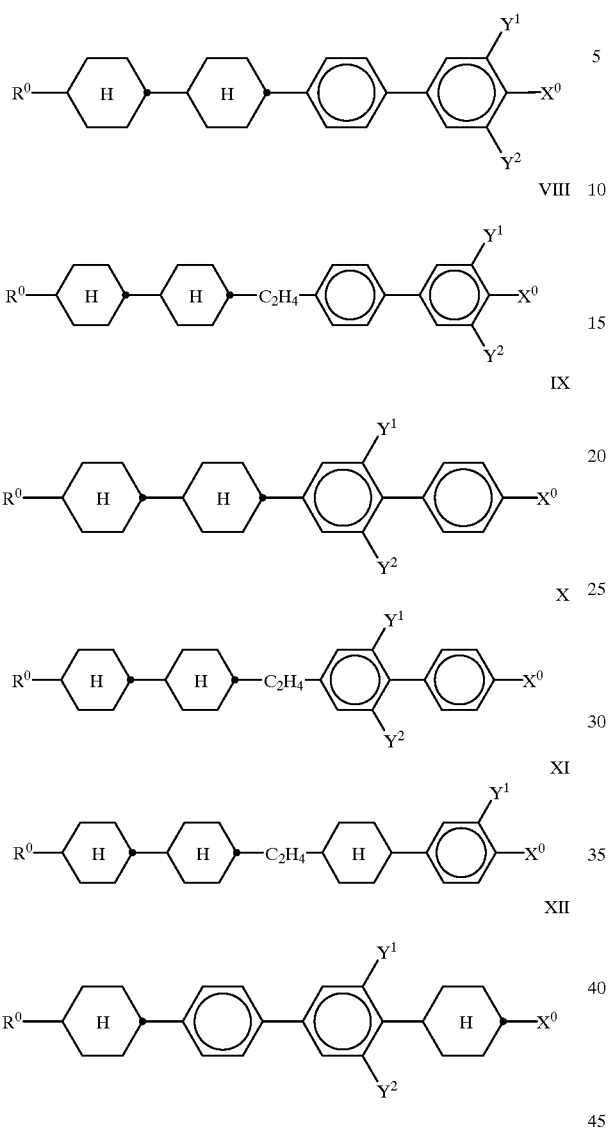

in which $R^0$, $X^0$, $Y^1$ and $Y^2$ are each, independently of one another, as defined above, and $X^0$ is preferably F, Cl, $CF_3$, $OCF_3$, or $OCHF_2$, and $R^0$ is preferably alkyl, oxaalkyl, fluoroalkyl or alkenyl, in each case having up to 6 carbon atoms.

The medium additionally comprises one or more compounds of the formula IIa:

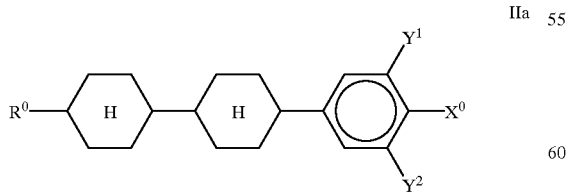

in which $R^0$, $X^0$, $Y^1$ and $Y^2$ are as defined for formula II above.

The proportion of compounds of the formulae I to VI together in the total mixture is at least 50% by weight; the proportion of compounds of the formula I in the total mixture is from 5 to 50% by weight, in particular from 7 to 35% by weight, especially from 9 to 20% by weight;

the proportion of compounds of the formulae II to VI in the total mixture is 20 to 80%, e.g., 30 to 70%, by weight.

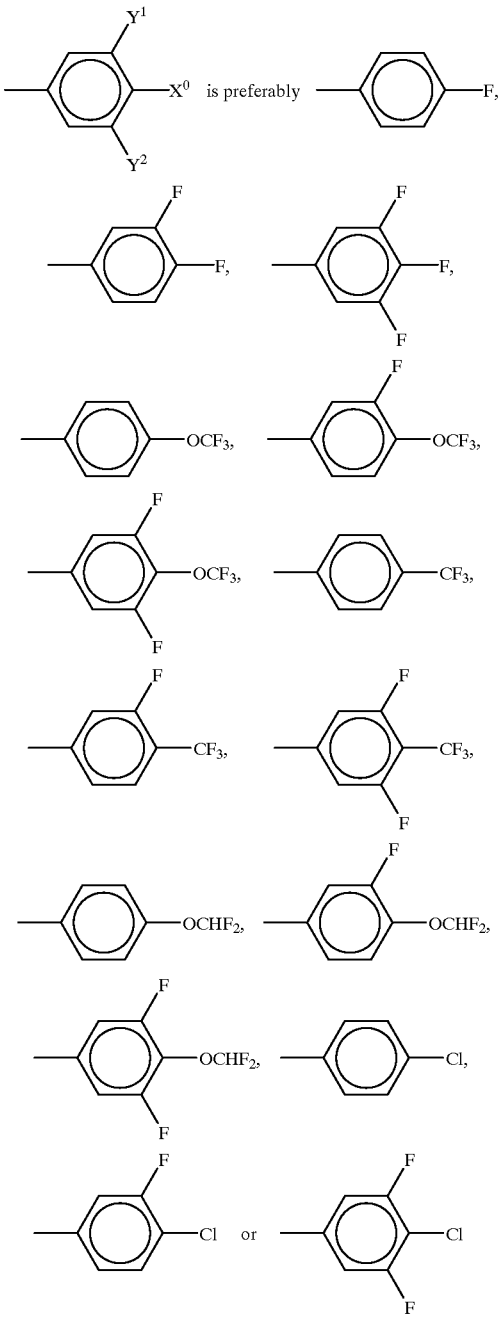

The medium comprises compounds of the formulae II, III, IV, V or VI.

$R^0$ is straight-chain alkyl or alkenyl having 2 to 7 carbon atoms.

The medium essentially consists of compounds of the formulae I to VI.

The medium comprises further compounds, preferably selected from the following group consisting of the general formulae XIII to XVI:

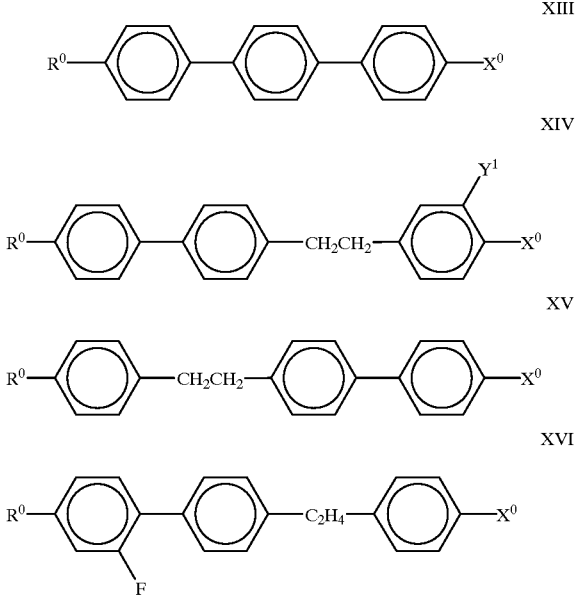

in which R⁰ and X⁰ are as defined above, for formula XVI X⁰ is preferably F or Cl, and the 1,4-phenylene rings can be substituted by CN, chlorine or fluorine. The 1,4-phenylene rings are preferably monosubstituted or polysubstituted by fluorine atoms.

The weight ratio I: (II+III+IV+V+VI) is preferably from 1:10 to 10:1.

The medium essentially consists of compounds selected from the group consisting of the general formulae I to XII.

It has been found that even a relatively small proportion of the compound of the formula I mixed with conventional liquid-crystal materials, but in particular with one or more compounds of the formula II, III, IV, V and/or VI, leads to a considerable decrease in the threshold voltage and to low birefringence values, where broad nematic phases with low smectic-nematic transition temperatures are simultaneously observed, which improves the storage stability. Particularly preferred are mixtures which, in addition to one or more compounds of the formula I, comprise one or more compounds of the formula IV, in particular compounds of the formula IVa, in which X⁰ is F or OCF₃. The compounds of the formulae I to VI are colourless, stable and readily miscible with one another and with other liquid-crystalline materials.

The term "alkyl" encompasses straight-chain and branched alkyl groups having preferably 1–7 carbon atoms, particularly the straight-chain groups methyl, ethyl, propyl, butyl, pentyl, hexyl and heptyl. Groups having 2–5 carbon atoms are generally preferred.

The term "alkenyl" encompasses straight-chain and branched alkenyl groups having preferably 2–7 carbon atoms, in particular the straight-chain groups. Particular alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups with terminal fluorine, i.e. fluoromethyl, 2-fluoroethyl, 3-fluoropropyl, 4-fluorobutyl, 5-fluoropentyl, 6-fluorohexyl and 7-fluoroheptyl. Other positions of fluorine are not precluded, however.

The term "oxaalkyl" preferably encompasses straight-chain radicals of the formula $C_nH_{2n+1}$—O—$(CH_2)_m$, where n and m are each, independently of one another, from 1 to 6. Preferably, n=1 and m is 1 to 6.

A suitable choice of the meanings of R⁰ and X⁰ allows the response times, the threshold voltage, the steepness of the transmission characteristic lines etc. to be modified as desired. For example, 1E-alkenyl radicals, 3E-alkenyl radicals, 2E-alkenyloxy radicals and the like generally result in shorter response times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally result in lower threshold voltages and smaller values of $k_{33}/k_{11}$ compared with alkyl and alkoxy radicals. A —CH₂CH₂— group generally results in higher $k_{33}/k_{11}$ values compared with a single covalent bond. Higher $k_{33}/k_{11}$ values facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum weight ratio of compounds of the formulae I and II+III+IV+V+VI largely depends on the desired properties, on the choice of the components of the formulae I, II, III, IV, V and/or VI, and on the choice of any other components which may be present. Suitable weight ratios within the range given above can easily be determined from case to case.

The total amount of compounds of the formulae I to XII in the mixtures according to the invention is not critical. The mixtures can therefore comprise one or more further components in order to optimize various properties. However, the observed effect on the response times and the threshold voltage is usually greater the higher the total concentration of compounds of the formulae I to XII.

In a particularly preferred embodiment, the media according to the invention comprise compounds of the formulae II to VI (preferably II, III and/or IV, especially IVa) in which X⁰ is F, OCF₃, OCHF₂, F, OCH=CF₂, OCF=CF₂ or OCF₂—CF₂H. A favourable synergistic effect with the compounds of the formula I results in particularly advantageous properties. Mixtures comprising compounds of the formula I and of the formula IVa are particularly notable for their low threshold voltages.

The construction of the MLC display according to the invention from polarizers, electrode base plates and surface-treated electrodes corresponds to the conventional construction for displays of this type. The term conventional construction is broadly drawn here and also covers all variations and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation.

The dielectrics may also comprise further additives known to the person skilled in the art and described in the literature. For example, 0–15% of pleochroic dyes or chiral dopants can be added.

C denotes a crystalline phase, S a smectic phase, $S_c$ a smectic C phase, N a nematic phase and I the isotropic phase.

$V_{10}$ denotes the voltage for 10% transmission (viewing direction perpendicular to the plate surface). $t_{on}$ denotes the on time and $t_{off}$ the off time at an operating voltage corresponding to 2.5 times the value of $V_{10}$. $\Delta n$ denotes the optical anisotropy and $n_o$ the refractive index. $\Delta\epsilon$ denotes the dielectric anisotropy ($\Delta\epsilon=\epsilon\|-\epsilon\bot$, where $\epsilon\|$ refers to the dielectric constant parallel to the longitudinal axes of the molecule and $\epsilon\bot$ is the dielectric constant perpendicular thereto). The electro-optical data were measured in a TN cell in the 1st minimum (i.e. at a d·$\Delta n$ value of 0.5) at 20° C., unless expressly stated otherwise. $\gamma_1$ denotes the rotational viscosity. The above data were measured at 20° C., unless expressly stated otherwise.

The entire disclosure of all applications, patents and publications, cited above and below, and of corresponding German Application No. 199 58 795.7 filed Dec. 7, 1999, is hereby incorporated by reference.

In the present application and in the following examples, the structures of the liquid-crystal compounds are specified by acronyms, which can be transformed into chemical formulae according to the following Tables A and B. All radicals $C_nH_{2n+1}$ and $C_mH_{2m+1}$ are straight-chain alkyl radicals having n or m carbon atoms. The coding according to Table B is self-evident. Table A specifies the acronym for the parent body only. In individual cases, the acronym for the parent body is followed, separated therefrom by a hyphen, by a code for the substituents $R^1$, $R^2$, $L^1$ and $L^2$:

| Code for $R^1$, $R^1$ $R^2$, $L^1$, $L^2$ | | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| $nCF_3$ | $C_nH_{2n+1}$ | $CF_3$ | H | H |
| $nOCF_3$ | $C_nH_{2n+1}$ | $OCF_3$ | H | H |
| $nOCF_2$ | $C_nH_{2n+1}$ | $OCHF_2$ | H | H |
| nS | $C_nH_{2n+1}$ | NCS | H | H |
| rVsN | $C_rH_{2r+1}$—CH=CH—$C_sH_{2s}$— | CN | H | H |
| rEsN | $C_rH_{2r+1}$—O—$C_sH_{2s}$— | CN | H | H |
| nAm | $C_nH_{2n+1}$ | $COOC_mH_{2m+1}$ | H | H |
| $nOCCF_2$.F.F | $C_nH_{2n+1}$ | $OCH_2CF_2H$ | F | F |

Preferred mixture components are shown in Tables A and B.

TABLE A

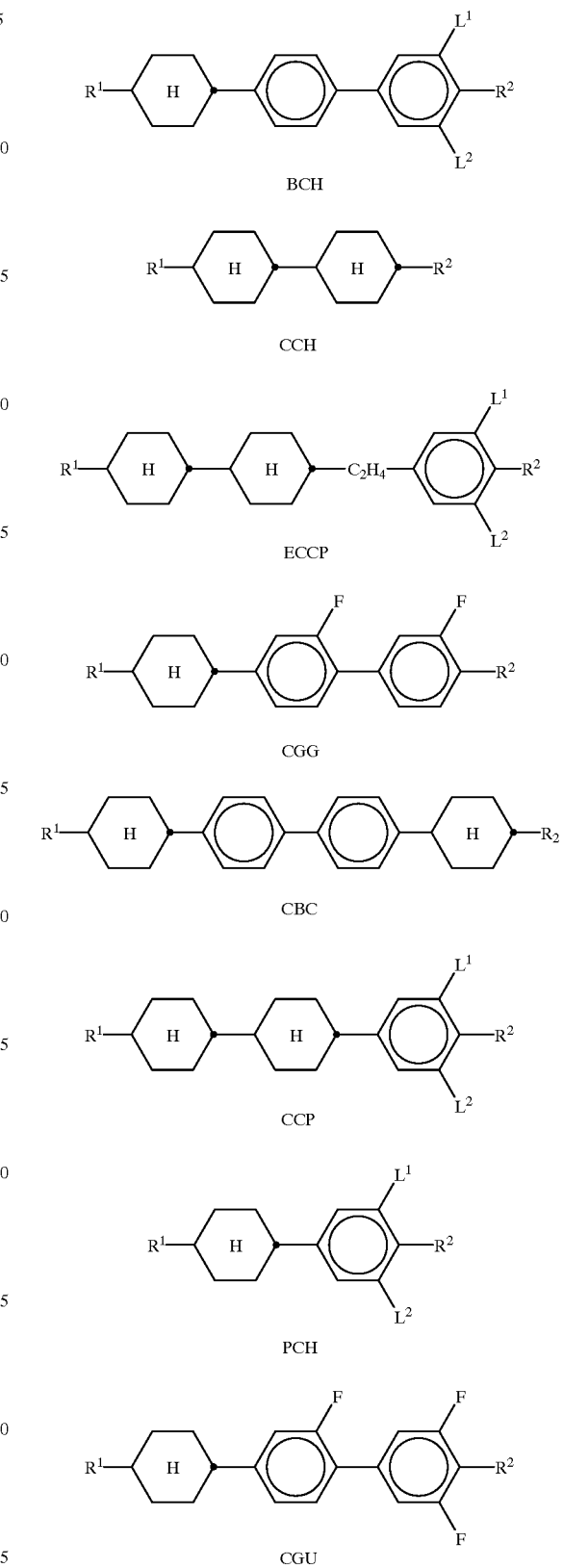

TABLE B

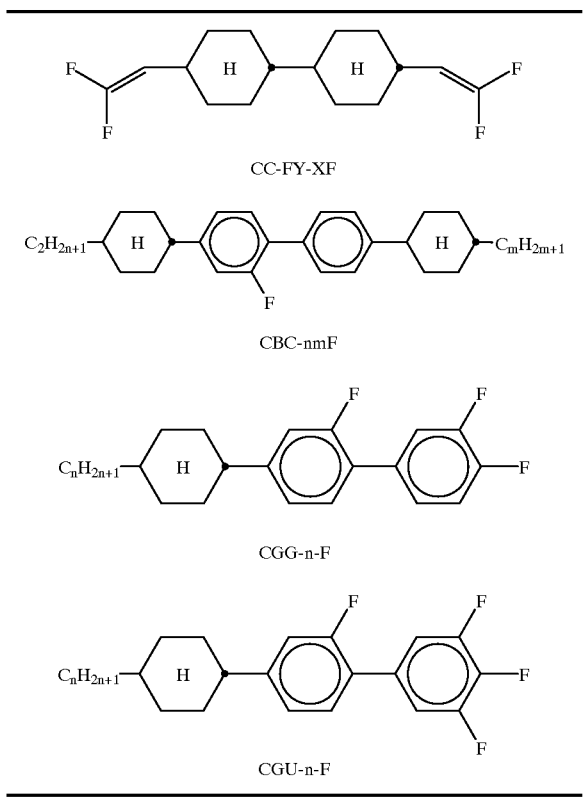

The following examples are intended to illustrate the invention without limiting it. Hereinbefore and hereinafter, percentages are given in per cent by weight. All temperatures are specified in degrees Celsius. m.p. denotes melting point, cl.p. denotes clearing point. Furthermore, C=crystalline state, N=nematic phase, S=smectic phase and I=isotropic phase. The data between these symbols represent the transition temperatures. Δn denotes the optical anisotropy (589 nm, 20° C.). The rotational viscosity $\gamma_1$ (mPa.s) was determined at 20° C.

EXAMPLE 1

| | | | |
|---|---|---|---|
| CC-FY-XF | 12.00 | Clearing point [° C.]: | +89.5 |
| CCP-20CF3 | 8.00 | Δn [589 nm, 20° C.]: | +0.0811 |
| CCP-30CF3 | 8.00 | Δε [1 kHz, 20° C.]: | +7.5 |
| CCP-40CF3 | 6.00 | $V_{(10,0,20)}$ [V]: | 1.61 |
| CCP-50CF3 | 8.00 | $\gamma_1$ [mPa·s]: | 127 |
| CCP-2F.F.F | 12.00 | | |
| CCP-3F.F.F | 11.00 | | |
| CCP-5F.F.F | 7.00 | | |
| CGU-3-F | 6.00 | | |
| CCP-20CF3.F | 12.00 | | |
| CCP-30CF3.F | 10.00 | | |

The mixture has a low rotational viscosity while maintaining favorable Δn and Δε values, and a low threshold voltage.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds having positive dielectric anisotropy, wherein said medium comprises a compound of formula I

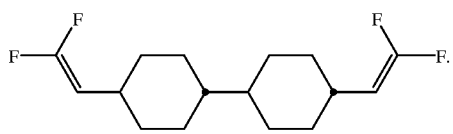

and said compound of formula (I) is of the following all-transconfiguration.

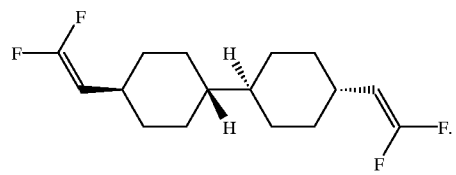

2. A medium according to claim 1, wherein said medium contains one or more compounds selected from formulae II, III, IV, V and VI:

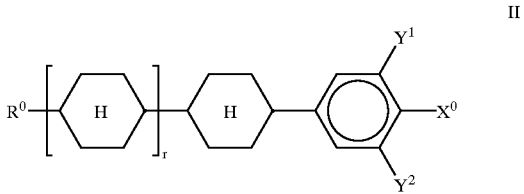

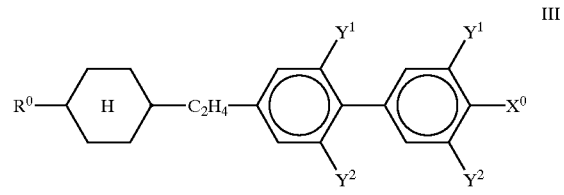

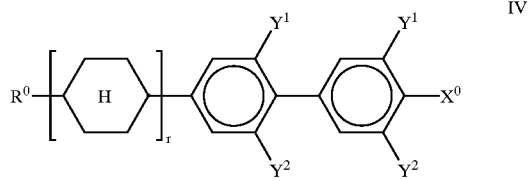

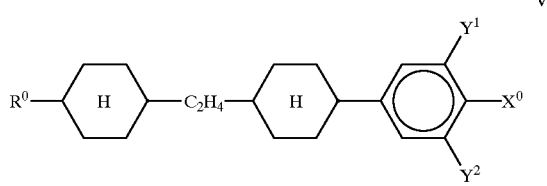

-continued

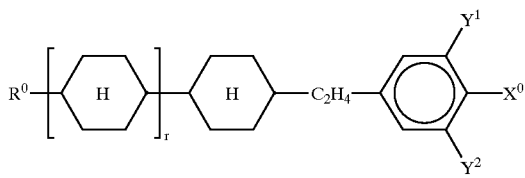
VI wherein

R⁰ is, in each case independently, n-alkyl, oxaalkyl, fluoroalkyl or alkenyl, in each case having up to 7 carbon atoms, X⁰ is, in each case independently, F, Cl, halogenated alkyl, alkenyl or alkoxy having up to 6 carbon atoms, Y¹ and Y² are each, in each case independently of one another, H or F, and r is, in each case independently, 0 or 1.

3. A medium according to claim 2, wherein the proportion of compounds of formulae I to VI together in said medium is at least 50% by weight.

4. A medium according to claim 1, wherein the proportion of the compound of formula I in said medium is 3–45% by weight.

5. A medium according to claim 2, wherein the proportion of compounds of formulae II to VI in said medium is 20–80% by weight.

6. A medium according to claim 1, wherein said medium further comprises a compound of formula IIa

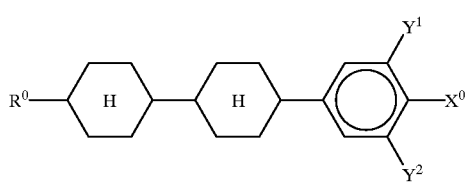
IIa wherein

R⁰ is, in each case independently, n-alkyl, oxaalkyl, fluoroalkyl or alkenyl, in each case having up to 7 carbon atoms, X⁰ is, in each case independently, F, Cl, halogenated alkyl, alkenyl or alkoxy having up to 6 carbon atoms, Y¹ and Y² are each, in each case independently of one another, H or F, and r is, in each case independently, 0 or 1.

7. A medium according to claim 6, wherein X⁰ is F or OCF₃ and Y¹ and Y² are each, independently, H or F.

8. A medium according to claim 2, wherein, in the compound of the formulae II to VI, R⁰ is alkyl having 1 to 7 carbon atoms or alkenyl having 2 to 7 carbon atoms.

9. In a method of generating an electro-optical display using a liquid-crystalline medium, the improvement wherein said medium is a medium according to claim 1.

10. In an electro-optical liquid-crystal display element containing a liquid-crystalline medium, the improvement wherein said medium is a medium according to claim 1.

11. A medium according to claim 1, wherein said medium has a nematic phase down to −20° C., a clearing point above 80° C., and a dielectric anisotropy value Δε of >5.

12. A liquid-crystalline medium according to claim 1, wherein said medium has a nematic phase down to −30 ° C.,
a clearing point above 85° C., and a dielectric anisotropy value Δε of >7.

13. A liquid-crystalline medium according to claim 1, wherein said medium has a TN threshold below 2.0 V.

14. A liquid-crystalline medium according to claim 1, wherein said medium has a rotational viscosity at 20° C. which is preferably <150 mPa.S.

15. A liquid crystalline medium according to claim 1, wherein said medium has a nematic phase range of at least 90° C.

16. A liquid-crystalline medium according to claim 1, wherein said medium further contains one or more compounds selected from formula VII to XII

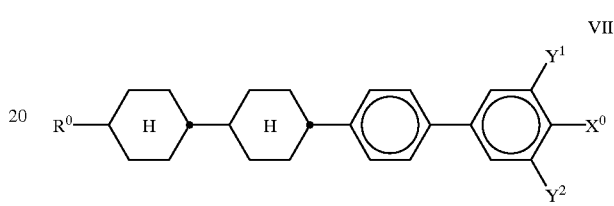
VII

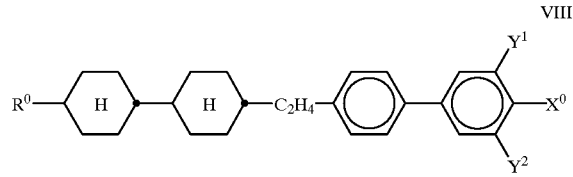
VIII

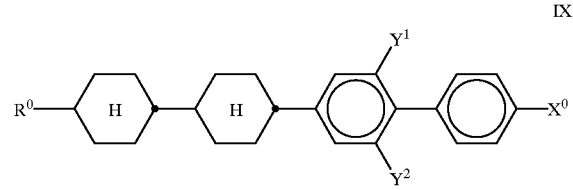
IX

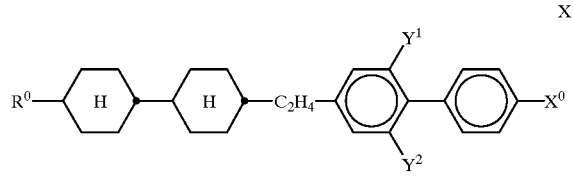
X

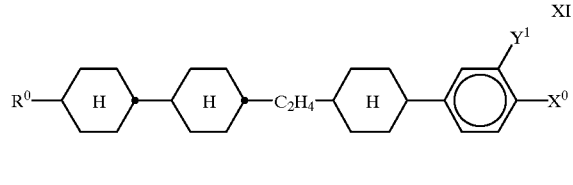
XI wherein

R⁰ is, in each case independently, n-alkyl, oxaalkyl, fluoroalkyl or alkenyl, in each case having up to 7 carbon atoms, X⁰ is, in each case independently, F, Cl, halogenated alkyl, alkenyl or alkoxy having up to 6 carbon atoms, Y¹ and Y² are each, in each case independently of one another, H or F, and r is, in each case independently, 0 or 1.

17. A liquid-crystalline medium according to claim 2, wherein said medium further contains one or more compounds selected from formula VII to XII.

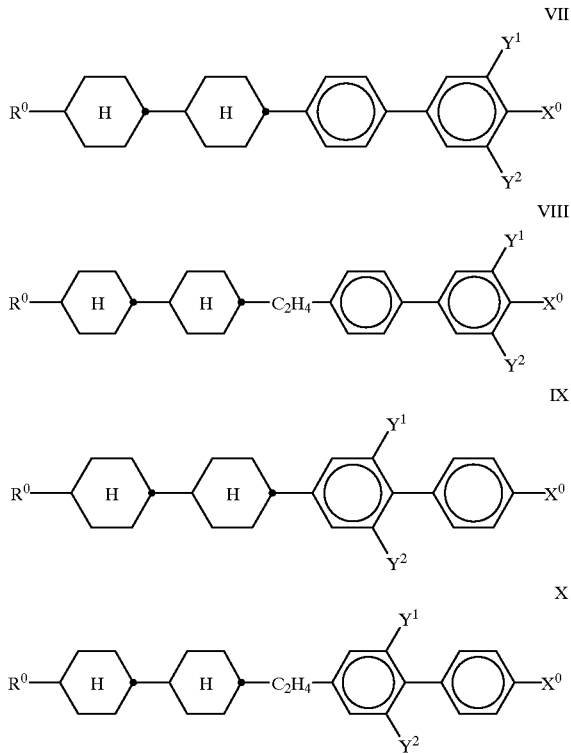

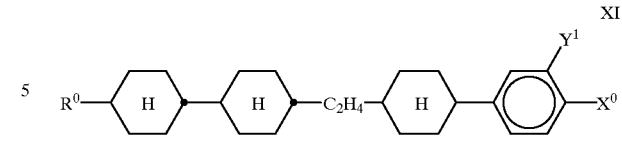

wherein $R^0$ is, in each case independently, n-alkyl, oxaalkyl, fluoroalkyl or alkenyl, in each case having up to 7 carbon atoms, $X^0$ is, in each case independently, F, Cl, halogenated alkyl, alkenyl or alkoxy having up to 6 carbon atoms, $Y^1$ and $Y^2$ are in each independently another, H or F, and r is, in each case independently, 0 or 1.

18. A medium according to claim 4, wherein the proportion of compounds of formula I in said medium is 10–40%.

19. A medium according to claim 5, wherein the proportion of compounds of formula II–VI in said medium is 30–70% by weight.

20. A liquid-crystalline medium according to claim 2, wherein the weight ratio of compounds of formula I to the combined weight of compounds of formula II–VI, is 1:10 to 10:1.

* * * * *

UNITED STATES PATENT AND TRADEMARK OFFICE
CERTIFICATE OF CORRECTION

PATENT NO.    : 6,544,603 B2
DATED         : April 8, 2003
INVENTOR(S)   : Kazuaki Tarumi et al.

It is certified that error appears in the above-identified patent and that said Letters Patent is hereby corrected as shown below:

Column 14,
Formula I reads "F." should read -- F --
Line 21, reads "transconfiguration." should read -- transconfiguration --

Column 16,
Line 15, reads "formula VII to XII" should read -- formulae VII to XI --
Line 67, reads "formula VII to XII." should read -- formulae VII to XI --

Column 18,
Line 17, reads "are in each independently another H," should read -- are each, in each case independently of one another, H --
Lines 23 and 27, reads "formula" should read -- formulae --

Signed and Sealed this

Twenty-sixth Day of April, 2005

JON W. DUDAS
*Director of the United States Patent and Trademark Office*